US012587734B2

(12) United States Patent　　　　(10) Patent No.:　US 12,587,734 B2

Inazawa et al.　　　　　　　　　　(45) Date of Patent:　　Mar. 24, 2026

(54) DISPLAY CONTROL APPARATUS, DISPLAY CONTROL METHOD, AND STORAGE MEDIUM

(71) Applicant: CANON KABUSHIKI KAISHA, Tokyo (JP)

(72) Inventors: Keisuke Inazawa, Tokyo (JP); Toshimichi Ise, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 293 days.

(21) Appl. No.: 18/358,127

(22) Filed: Jul. 25, 2023

(65) Prior Publication Data

US 2024/0040239 A1　　Feb. 1, 2024

(30) Foreign Application Priority Data

Jul. 29, 2022　(JP) .................................. 2022-122016

(51) Int. Cl.
　　*H04N 23/63* 　　　(2023.01)
　　*H04N 23/667* 　　(2023.01)
(52) U.S. Cl.
　　CPC ......... *H04N 23/635* (2023.01); *H04N 23/632* (2023.01); *H04N 23/667* (2023.01)
(58) Field of Classification Search
　　CPC .. H04N 23/667; H04N 23/632; H04N 23/635; H04N 23/631; H04N 23/62; H04N 23/633; H04N 23/67
　　See application file for complete search history.

(56) References Cited

U.S. PATENT DOCUMENTS

| | | | |
|---|---|---|---|
| 2011/0134273 A1 | 6/2011 | Mise | |
| 2019/0313033 A1* | 10/2019 | Ota | ...................... H04N 23/634 |
| 2023/0379570 A1 | 11/2023 | Emori | |

FOREIGN PATENT DOCUMENTS

| | | |
|---|---|---|
| JP | 2007240935 A | 9/2007 |
| JP | 2013-085178 A | 5/2013 |
| JP | 5534856 B2 | 7/2014 |

(Continued)

OTHER PUBLICATIONS

The above foreign patent documents were cited in the Jun. 7, 2024 Japanese Office Action, which is enclosed without an English Translation, that issued in Japanese Patent Application No. 2022-122016.

(Continued)

*Primary Examiner* — Xi Wang

(74) *Attorney, Agent, or Firm* — Cowan, Liebowitz & Latman, P.C.

(57)　　　　　ABSTRACT

A display control apparatus, comprises: obtaining unit for obtaining an image captured by an image capturing unit; display controlling unit for performing control to display the image on a display unit; and changing unit for changing to at least one of a display format of a first display indicating a predetermined specific image capture state or a display format of a second display indicating a predetermined specific focus state. In a case where the first display and the second display are superimposed on the image, the changing unit changes at least one of the display format of the first display or the display format of the second display to make the display format of the first display and the display format of the second display different display formats.

15 Claims, 9 Drawing Sheets

(56)         References Cited

FOREIGN PATENT DOCUMENTS

| JP | 2018097380 A | 6/2018 |
| JP | 2019060913 A | 4/2019 |
| JP | 2020018000 A | 1/2020 |
| JP | 2021117469 A | 8/2021 |
| WO | 2017/086065 A | 5/2017 |
| WO | 2022079945 A1 | 4/2022 |

OTHER PUBLICATIONS

Grass Valley, "User's Guide", 3922 496 32171, Sep. 2015 v.1.2, EyeCatcher EC744, 7.4-inch OLED Viewfinder, pp. 1-31.
The above patent documents were cited in a European Search Report issued on Jul. 14, 2025, which is enclosed, that issued in the corresponding European Patent Application No. 23180895.7.

* cited by examiner

F I G. 2A
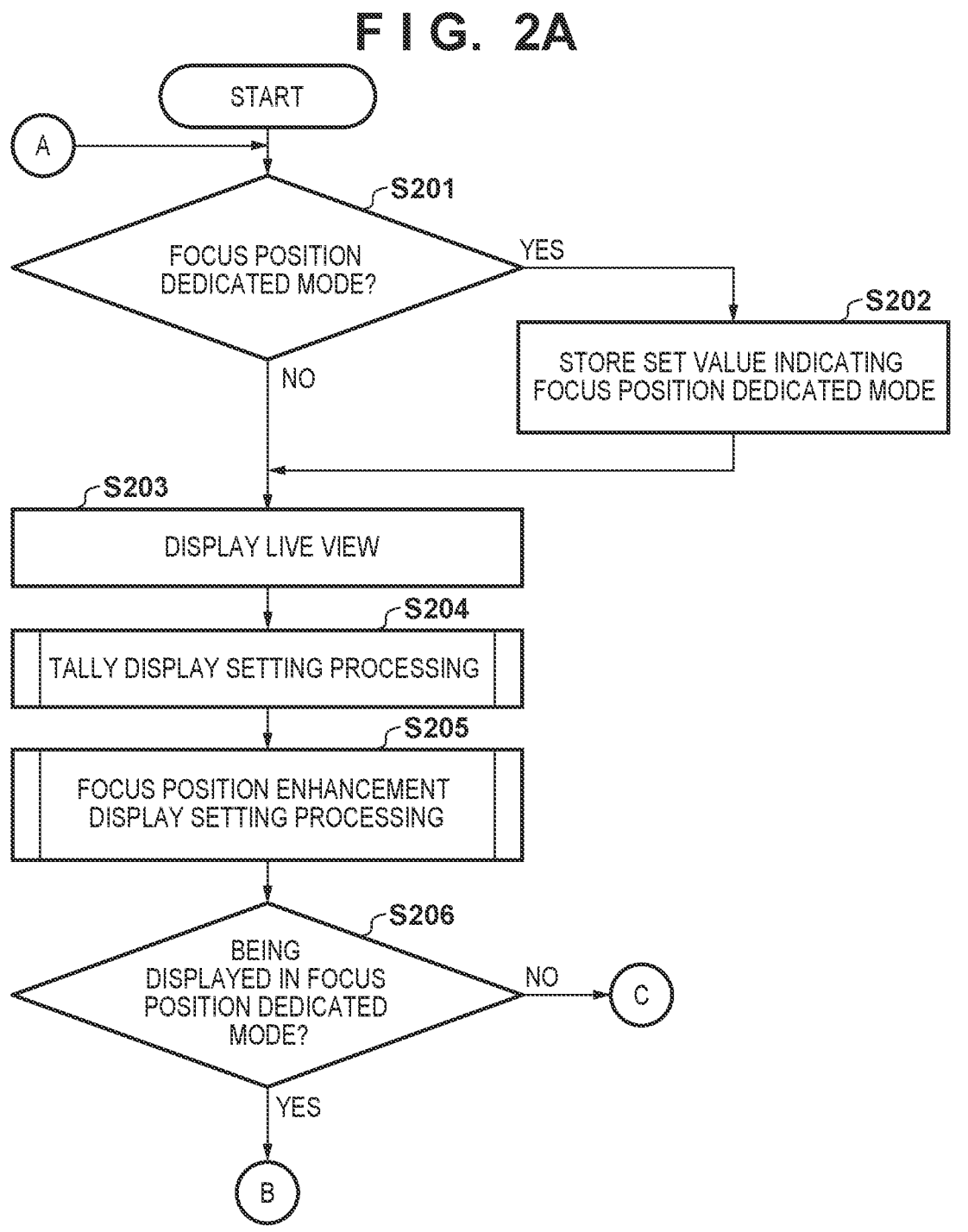

F I G. 2B
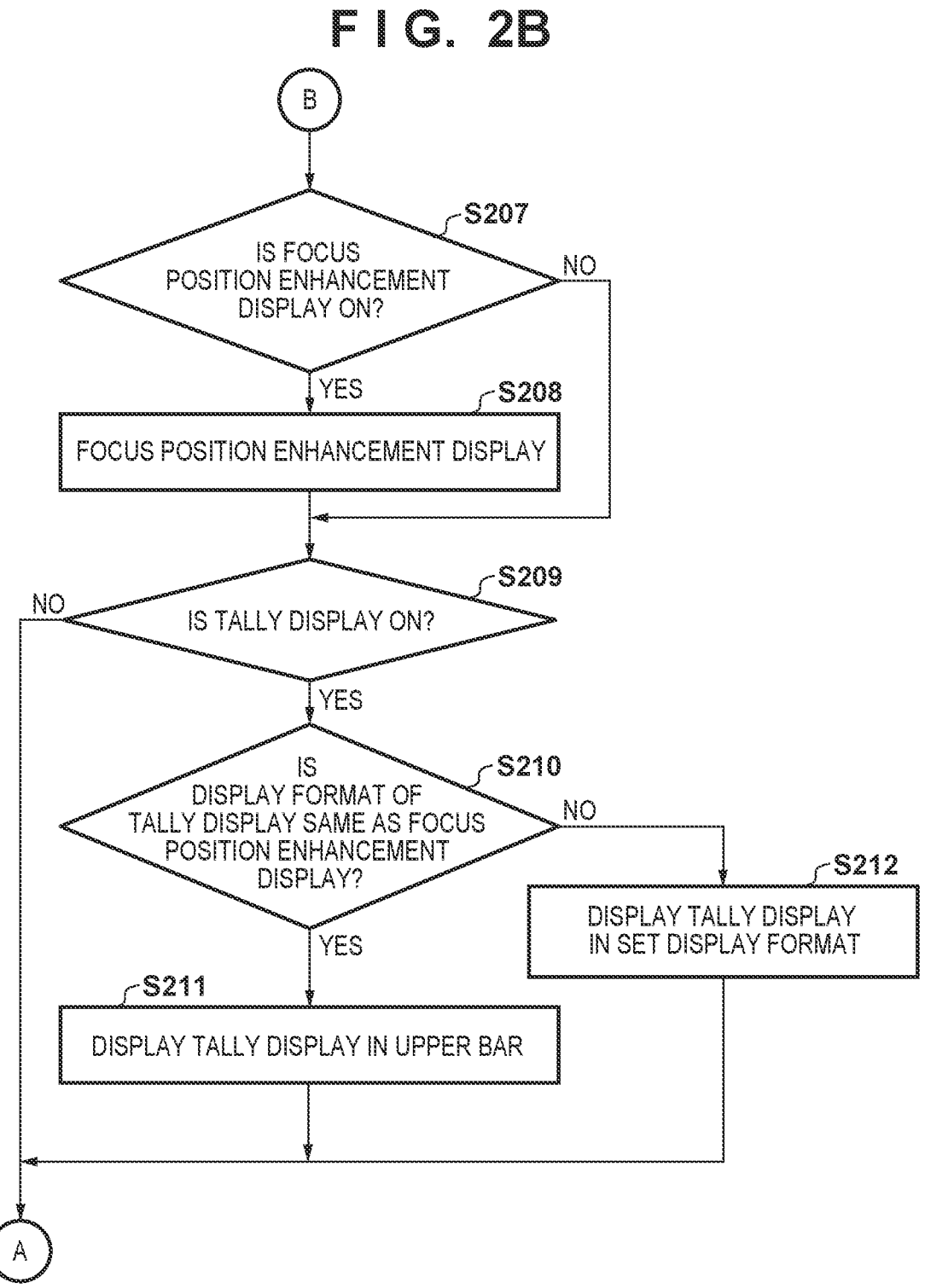

F I G.  2C

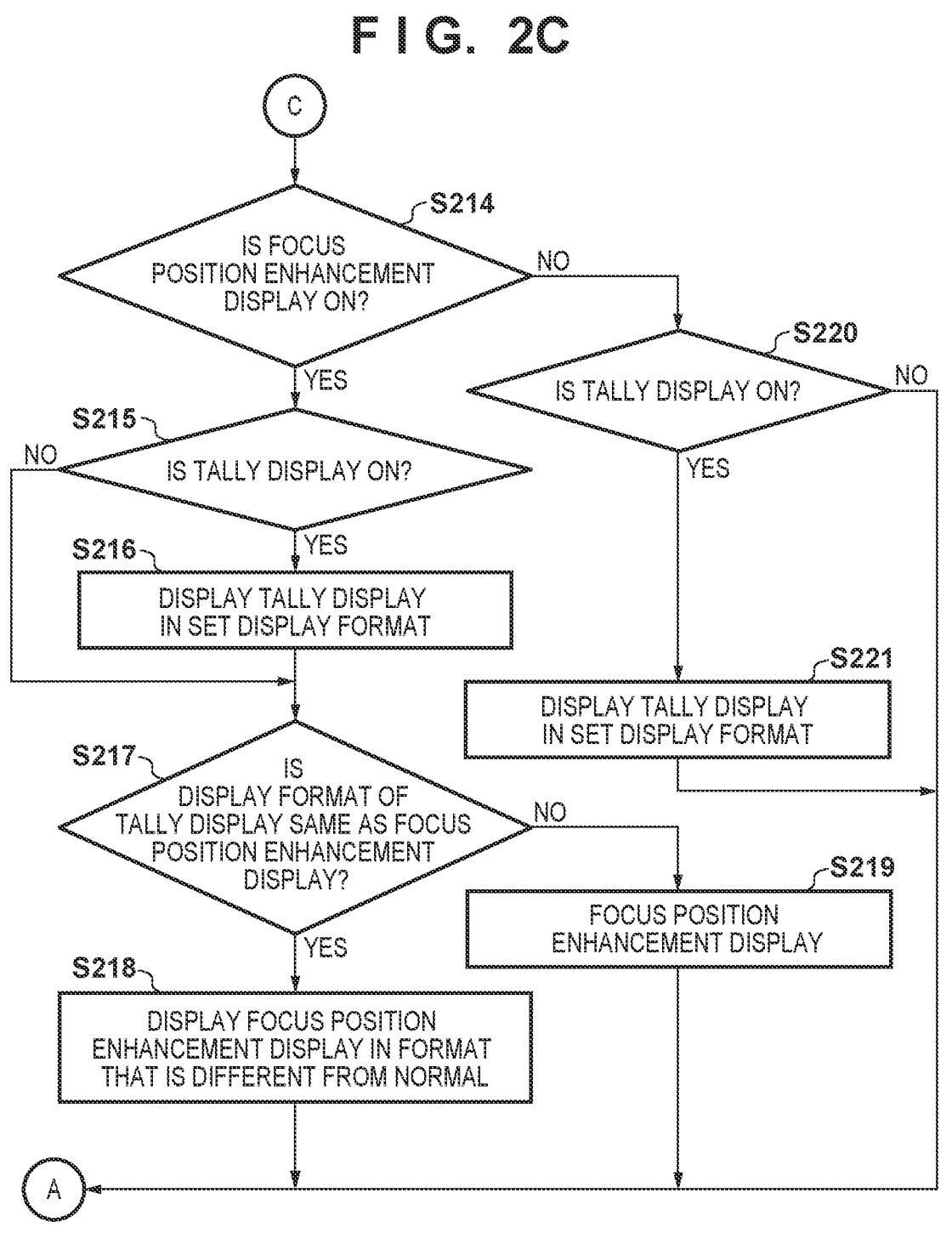

C

S214

IS FOCUS
POSITION ENHANCEMENT
DISPLAY ON?

NO

YES

S215

NO

IS TALLY DISPLAY ON?

YES

S216

DISPLAY TALLY DISPLAY
IN SET DISPLAY FORMAT

S220

IS TALLY DISPLAY ON?

NO

YES

S221

DISPLAY TALLY DISPLAY
IN SET DISPLAY FORMAT

S217

IS
DISPLAY FORMAT OF
TALLY DISPLAY SAME AS FOCUS
POSITION ENHANCEMENT
DISPLAY?

NO

YES

S219

FOCUS POSITION
ENHANCEMENT DISPLAY

S218

DISPLAY FOCUS POSITION
ENHANCEMENT DISPLAY IN FORMAT
THAT IS DIFFERENT FROM NORMAL

A

F I G. 4
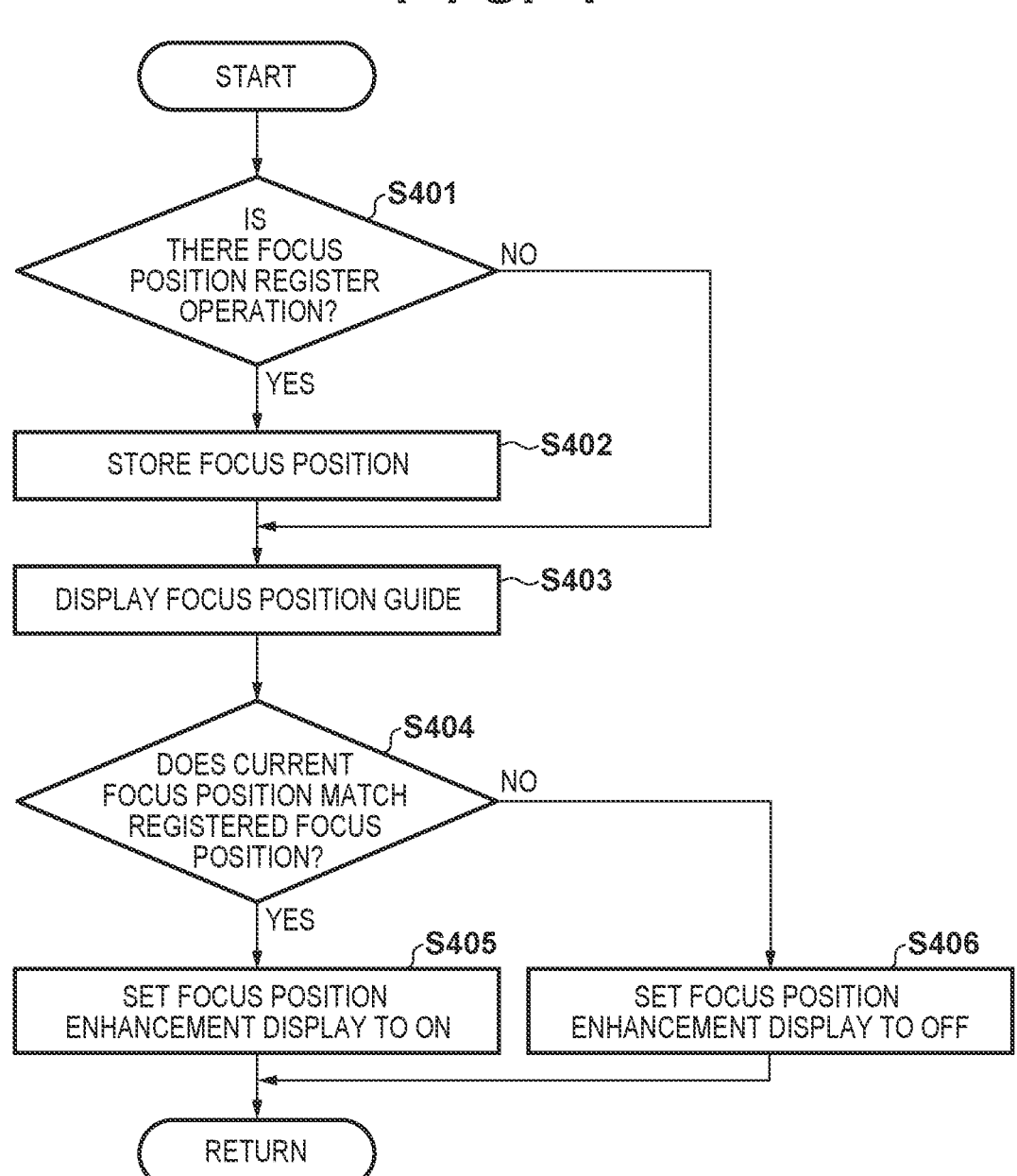

F I G. 5A
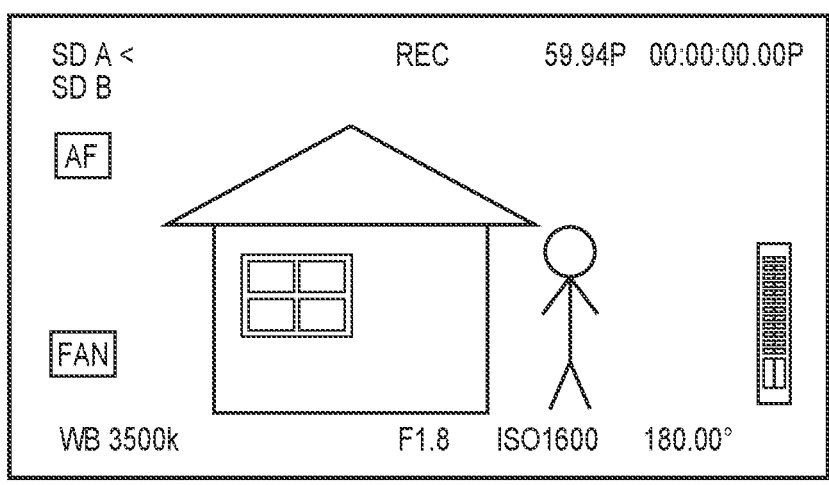
F I G. 5B
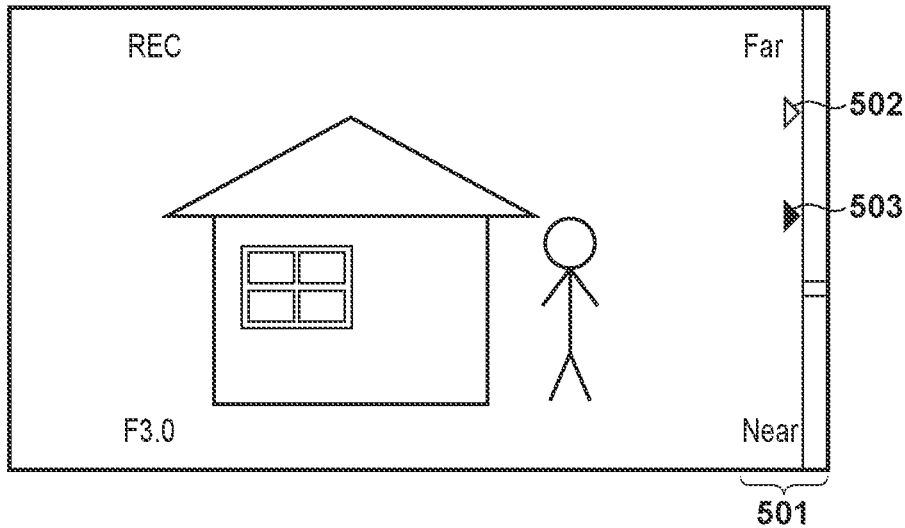

F I G. 7
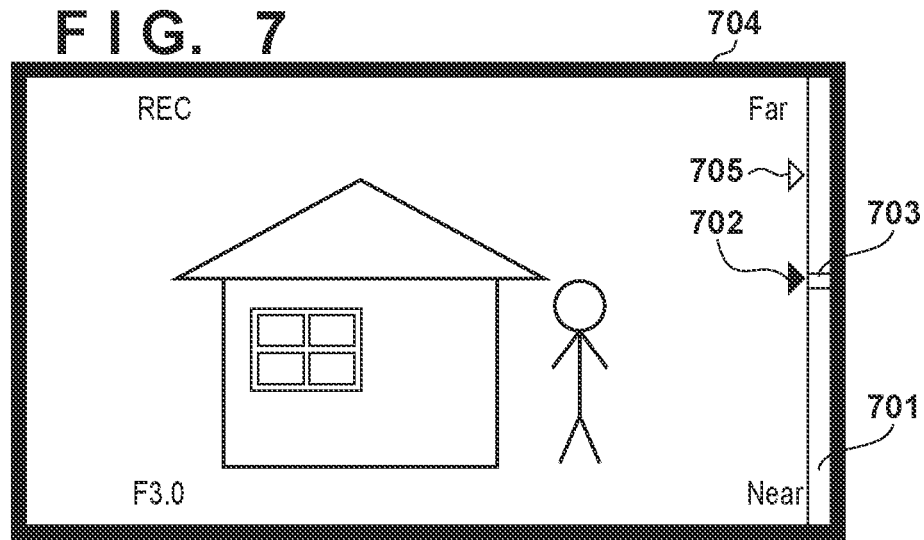
F I G. 8A
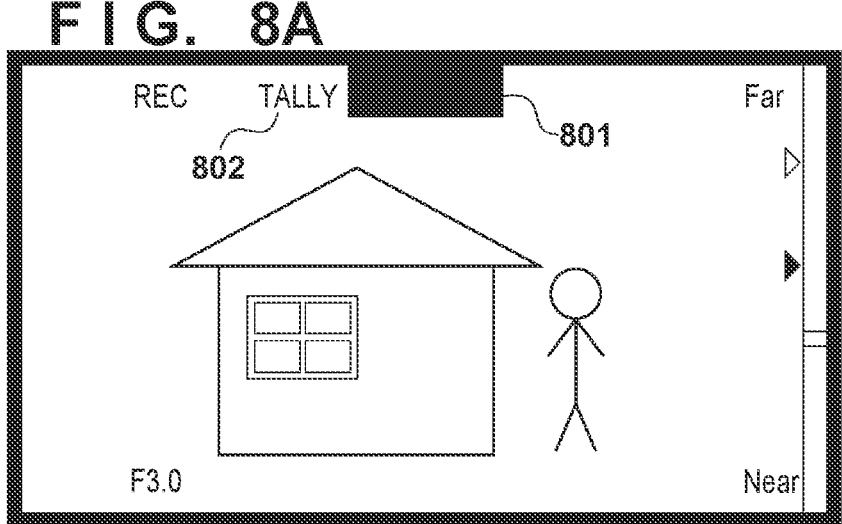
F I G. 8B
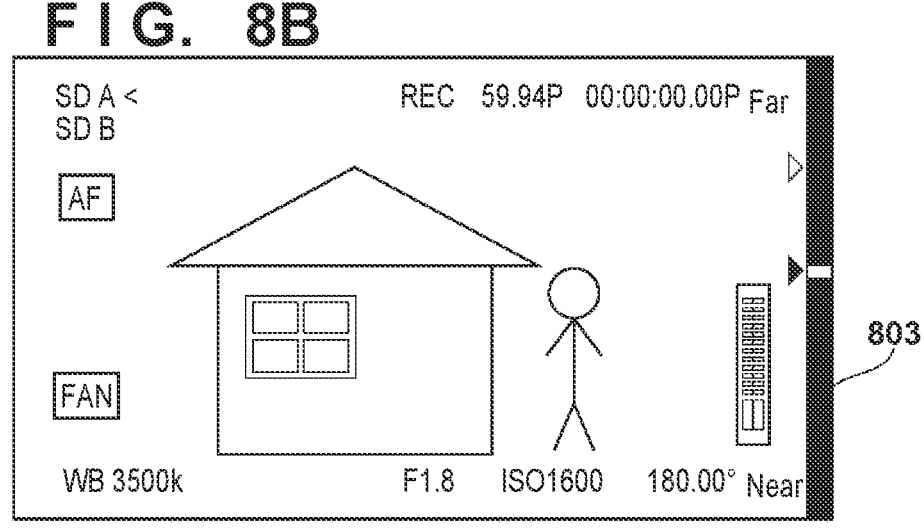

DISPLAY CONTROL APPARATUS, DISPLAY CONTROL METHOD, AND STORAGE MEDIUM

BACKGROUND OF THE INVENTION

Field of the Invention

The present invention relates to a display control apparatus, a display control method, and a storage medium and particularly relates to techniques for displaying states of a display control apparatus.

Description of the Related Art

A known camera allows the focus position to be checked without looking away from the viewfinder by displaying the focus position on the viewfinder.

Also, a known configuration allows a predetermined focus position to be registered and notifies the user when focused at the registered position. This display may be achieved by displaying a frame surrounding the screen displayed on the viewfinder. With this display using such a frame, the user can be made aware of being focused at the registered focus position and not just have their attention on one point in the VF. Such a frame display can be used in applications other than just focus notification. For example, a known camera displays such a frame to notify a tally signal input.

In Japanese Patent No. 5534856, a method is described for avoiding overlap by reducing the size of an icon when icons overlap. In Japanese Patent Laid-Open No. 2013-85178, a method is described for avoiding overlap by moving an icon when an icon overlaps a subject.

In the configurations described above, the display of a frame surrounding the screen may be used not only to notify the registered focus position being in focus, but also to notify a tally signal input. In such cases, since both frame displays overlap, it is difficult for the user to distinguish between whether the frame display is indicating being focused at the registered focus position or indicating a tally signal input.

SUMMARY OF THE INVENTION

The present invention has been made in consideration of the above situation, and displays a plurality of different specific states so that each state can be easily distinguished in a display control apparatus.

According to the present invention, provided is a display control apparatus, comprising one or more processors and/or circuitry which function as: an obtaining unit that obtains an image captured by an image capturing unit; a display controlling unit that performs control to display the image on a display unit; and a changing unit that changes to at least one of a display format of a first display indicating a predetermined specific image capture state or a display format of a second display indicating a predetermined specific focus state, wherein, in a case where the first display and the second display are superimposed on the image, the changing unit changes at least one of the display format of the first display or the display format of the second display to make the display format of the first display and the display format of the second display different display formats.

Further, according to the present invention, provided is a display control apparatus, comprising one or more processors and/or circuitry which function as: an obtaining unit that obtains an image captured by an image capturing unit; a receiving unit that receives a tally signal from an external apparatus; and a display controlling unit that performs control to display an image on a display unit, wherein in response to the receiving unit receiving the tally signal, the display controlling unit performs control to display a first display item indicating that the tally signal is received, and in a display mode displaying a second display item indicating a predetermined specific focus state, in a case where the first display item is also displayed, the display controlling unit performs display control to make the first display item and the second display item have different display formats.

Furthermore, according to the present invention, provided is a display control method, comprising: obtaining an image captured by image capturing unit; controlling to display the image on a display unit; displaying a display format of a first display indicating a predetermined specific image capture state and a display format of a second display indicating a predetermined specific focus state; and in a case where the first display and the second display are superimposed on the image, changing at least one of the display format of the first display or the display format of the second display to make the display format of the first display and the display format of the second display different display formats.

Further, according to the present invention, provided is a computer-readable storage medium storing a program for causing a computer to function as the unit of the display control apparatus comprising: an obtaining unit that obtains an image captured by an image capturing unit; a display controlling unit that performs control to display the image on a display unit; and a changing unit that changes to at least one of a display format of a first display indicating a predetermined specific image capture state or a display format of a second display indicating a predetermined specific focus state, wherein, in a case where the first display and the second display are superimposed on the image, the changing unit changes at least one of the display format of the first display or the display format of the second display to make the display format of the first display and the display format of the second display different display formats.

Further, according to the present invention, provided is a display control method, comprising: obtaining an image captured by an image capturing unit; receiving a tally signal from an external apparatus; controlling to display the image on a display unit; in response to receiving the tally signal, performing control to display a first display item indicating that the tally signal has been received; and in a display mode displaying a second display item indicating a predetermined specific focus state, in a case where the first display item is also displayed, performing control to make the first display item and the second display item have different display formats.

Further, according to the present invention, provided is a computer-readable storage medium storing a program for causing a computer to function as the unit of the display control apparatus comprising one or more processors and/or circuitry which function as: an obtaining unit that obtains an image captured by an image capturing unit; a receiving unit that receives a tally signal from an external apparatus; and a display controlling unit that performs control to display an image on a display unit, wherein in response to the receiving unit receiving the tally signal, the display controlling unit performs control to display a first display item indicating that the tally signal is received, and in a display mode displaying a second display item indicating a predetermined specific focus state, in a case where the first display item is also displayed, the display controlling unit performs display control to make the first display item and the second display item have different display formats.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A to 2C shows a flowchart illustrating display control processing according to the embodiment.

FIG. 4 is a flowchart illustrating focus position enhancement display setting processing according to the embodiment.

FIGS. 5A and 5B are diagrams illustrating examples of a display screen according to the embodiment.

FIG. 7 is a diagram illustrating an example of a display screen according to the embodiment.

FIGS. 8A and 8B are diagrams illustrating examples of a display screen according to the embodiment.

DESCRIPTION OF THE EMBODIMENTS

Figure 1:
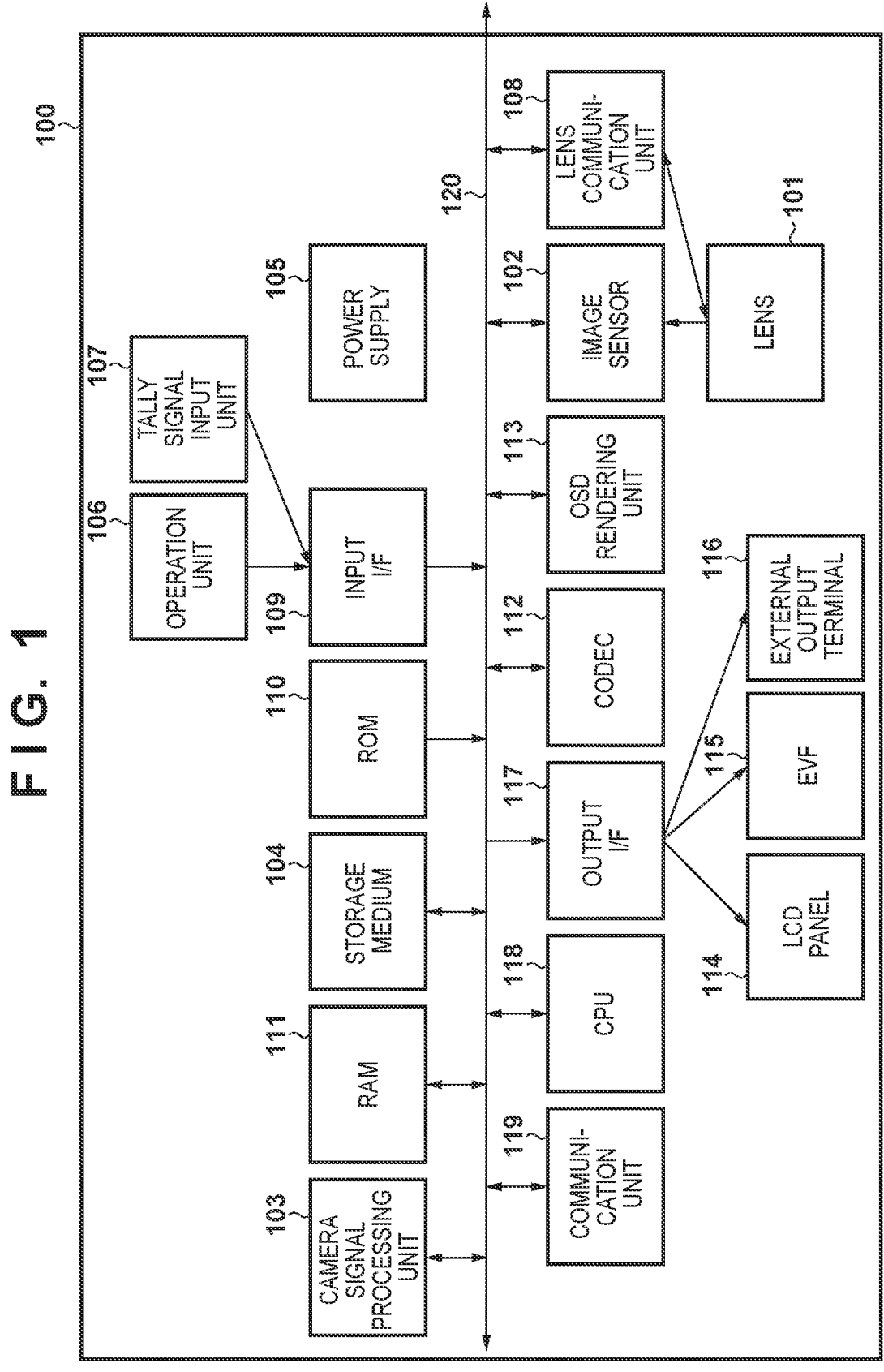
FIG. 1 is a block diagram illustrating the functional configuration of a video camera according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram illustrating the functional configuration of a video camera 100 as an example of a display control apparatus according to an embodiment.

The video camera 100 includes a lens 101, an image sensor 102, a camera signal processing unit 103, a storage medium 104, a power supply 105, an operation unit 106, a tally signal input unit 107, an input I/F 109, a ROM 110, a RAM 111, and a CODEC 112. An On Screen Display (OSD) rendering unit 113, an output I/F 117, an LCD panel 114, an EVF 115, an external output terminal 116, a CPU 118, and a communication unit 119 are also provided.

The CPU 118 executes various types of programs stored in the ROM 110 and the like, controls the entire video camera 100, and inputs and outputs data via a data bus 120.

The lens 101 is an imaging lens (optical system) including a focus lens, a zoom lens, a diaphragm mechanism, and the like and forms an optical image of the incident subject on the image sensor 102. The image sensor 102 is constituted of a CMOS sensor, a CCD, or the like, includes an A/D converter, and converts the optical image formed by the lens 101 to an analog electrical signal via photoelectric conversion and then to a digital signal. Resizing processing such as pixel interpolation and reduction processing, color conversion processing, various types of correction processing, and the like are executed by the camera signal processing unit 103 on the digital signal obtained via conversion. Also, compression encoding using a predetermined bit rate and format is performed using the CODEC 112 described below.

The storage medium 104 stores captured images and metadata to be attached to the captured images. The power supply 105 is an AC power supply or battery and supplies the power required for each unit of the video camera 100.

The operation unit 106 is constituted of a switch for controlling the ON/OFF of the power supply 105 of the video camera 100, a menu display button, a four-direction key, a touch panel or similar pointing device, or the like or a combination thereof. The operation unit 106 includes a switch for switching between a focus position dedicated mode described below and a normal mode, which are display modes, a switch for instructing to register a focus position of a focus position guide, and a moving image record switch for instructing to record moving images. When the moving image record switch is pressed by the user, for example, moving image recording is started, and when the moving image record switch is pressed again by the user during moving image recording, moving image recording is stopped. Note that switches may be provided for both starting and stopping moving image recording.

The operation information received by the operation unit 106 is input into the CPU 118 via the input I/F 109 and the data bus 120.

The tally signal input unit 107 receives a tally signal from an external apparatus. A tally signal is used to notify the video camera 100 of the image capture state of the video camera 100. Note that in the present embodiment, a tally signal is input from the tally signal input unit 107, but the input unit for the tally signal is not limited to a dedicated input unit such as this. For example, a tally signal may be received via the communication unit 119 via wireless communication or may be received via the external output terminal 116 via a wired cable, such as an SDI cable or a HDMI cable.

A lens communication unit 108 obtains installation information of the lens 101 and information such as the position of the focus lens, focal length, and field of view by communicating with the lens 101 in a case where the lens 101 is a detachable lens. Note that the lens 101 may be integrally formed with the video camera 100.

A program for controlling the video camera 100 is stored in the ROM 110, and the CPU 118 controls the components on the basis of this program. The RAM 111 functions as the working area of the CPU 118.

The CODEC 112 compression-encodes the digital signals obtained via image capture as described above and also decodes compression-encoded image data and audio data stored in the RAM 111 and the storage medium 104. The decoded image data is displayed on the LCD panel 114 described below, the EVF 115, or a monitor or the like connected to the external output terminal 116, and the decoded audio data is reproduced on a not-illustrated speaker.

The OSD rendering unit 113 renders OSD items, such as character strings and icons representing the state and settings of the video camera 100, various types of frames and markers, and menus for various settings, to the VRAM on the RAM 111 on the basis of the display data of the OSD items generated by the CPU 118. Resource data, such as characters and icons forming the OSD items are stored in the ROM 110, read out by the OSD rendering unit 113, and rendered to the VRAM.

The output I/F 117 includes a mixer circuit, generates display data with the OSD items rendered to the VRAM superimposed on the image data generated by the image sensor 102 and the camera signal processing unit 103, and outputs the display data to the LCD panel 114, the EVF 115, and the external output terminal 116. Also, the output I/F 117 can output a signal resized to suit each output. Each output destination can display the same OSD item content or can display different content using a method described below.

The external output terminal 116 is a terminal that satisfies the SDI or HDMI (registered trademark) standard and outputs the image data generated by the image sensor 102 and the camera signal processing unit 103 to an external device.

The communication unit 119 exchanges image signals, audio signal, and various types of information with an external device connected wirelessly or with a wired cable.

Next, display control processing according to the present embodiment executed by the video camera 100 with the configuration described above will be described with reference to the flowchart in FIGS. 2A to 2C. This processing is implemented by the CPU 118 operating on the basis of a program stored in the ROM 110 or the storage medium 104 or a program obtained via the communication unit 119 and controlling the components of the video camera 100. Also, the flowchart in FIGS. 2A to 2C is started when the video camera 100 starts up.

In the present embodiment, the display modes include a focus position dedicated mode and a normal mode, and the user can switch between modes by operating the operation unit 106.

In step S201, it is determined whether or not the display mode is set to the focus position dedicated mode. The focus position dedicated mode is a mode dedicated to displaying a focus position guide.

Herein, the focus position guide will be described. The focus position guide is an indicator displayed when focus adjustment by manual operation (MF) processing is executed and is a function that assists MF processing by storing a focus position previously used to focus and displaying this position and the current focus lens position. Consider an example in which after a focus position used to focus on a subject is registered and then another subject is focused on, the focus is to be returned to the first subject. At this time, the user can visually compare the registered focus position and the current focus lens position on the display screen and can move the current focus lens position close to the registered focus position. In this manner, since the user can visually comprehend the manual operation amount from the current focus lens position to the registered focus position, refocusing is made easy and the burden on the user and time loss can be reduced. Note that a plurality of focus positions can be registered and displayed.

In this manner, by registering a discretionary focus position in the focus position guide, the user can check the focus position of the video camera 100 via the focus position guide displayed on the OSD. In the focus position dedicated mode, items displayed on the OSD are restricted to items relating to display of the focus position guide and the minimum required for image capture. Since the number of displayed items is less than in the normal mode, the focus position guide can be displayed without overlapping other display objects. Also, since the image display area is large, the user can easily visually inspect the image. FIG. 5A is a diagram illustrating an example of a screen in the normal mode. FIG. 5B is a diagram illustrating an example of a screen in the focus position dedicated mode.

If it is YES in step S201, the processing proceeds to step S202. If it is NO, the processing proceeds to step S203.

In step S202, a set value indicating focus position dedicated mode is stored in the RAM 111, and the processing proceeds to step S203.

In step S203, processing (live view) to sequentially display the images captured by the image sensor 102 and the camera signal processing unit 103 is executed. Here, the images are input to the output I/F 117, the input images are superimposed with OSD items by the output I/F 117, and this is then output to the LCD panel 114, the EVF 115, and/or the external output terminal 116 as a display signal.

In step S204, setting processing is executed for tally display for indicating that a tally signal has been input into the tally signal input unit 107.

Figure 3:
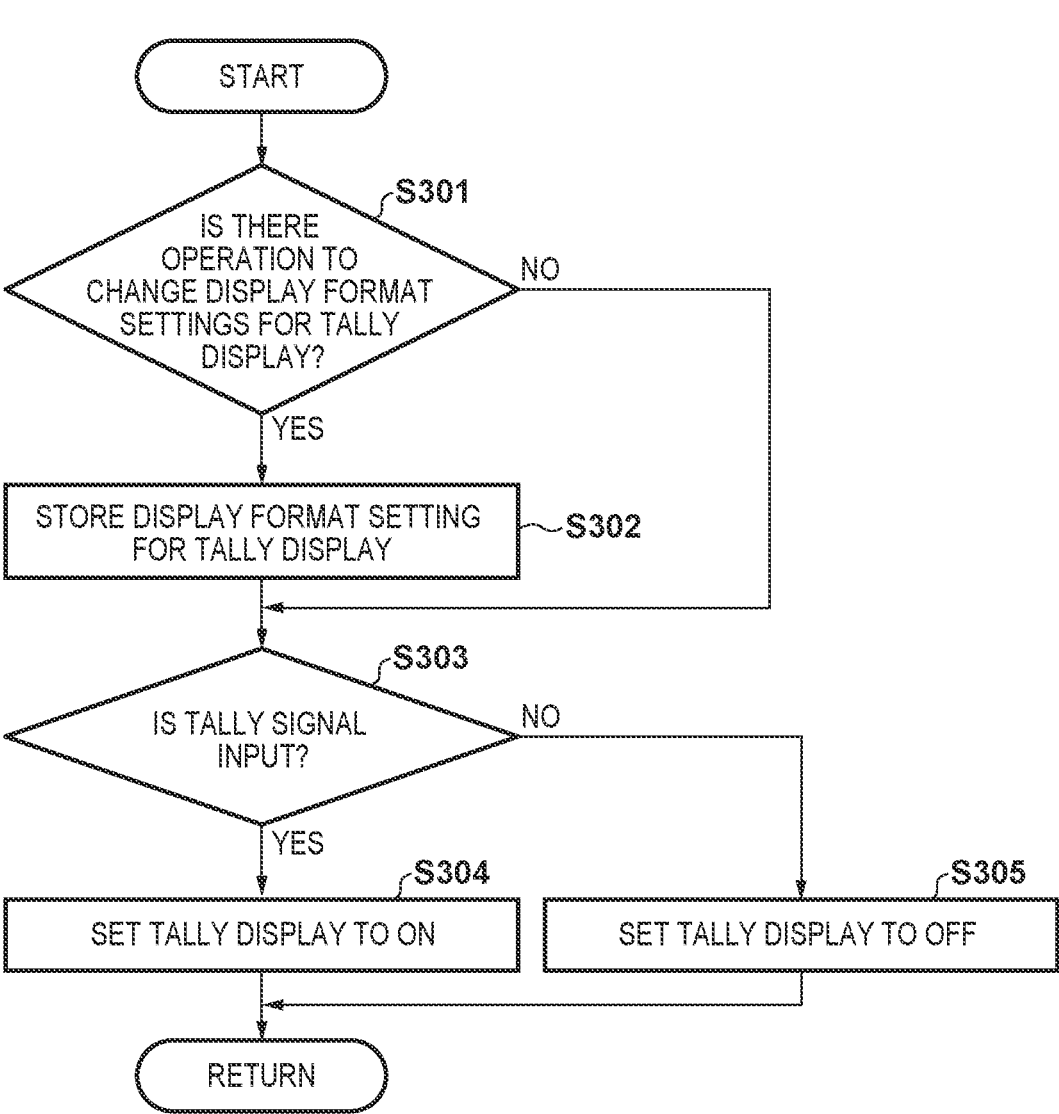
FIG. 3 is a flowchart illustrating tally display setting processing according to the embodiment.

The setting processing for tally display executed in step S204 will now be described with reference to the flowchart in FIG. 3.

First, in step S301, it is determined whether or not there has been an operation to change the display format settings for the tally display. In the present embodiment, the user can select from display formats of the tally display including a frame surrounding the screen, a bar in the upper portion of the screen, and a bar in the lower portion of the screen, and one of these display formats is preset for the initial state.

Figure 6A:
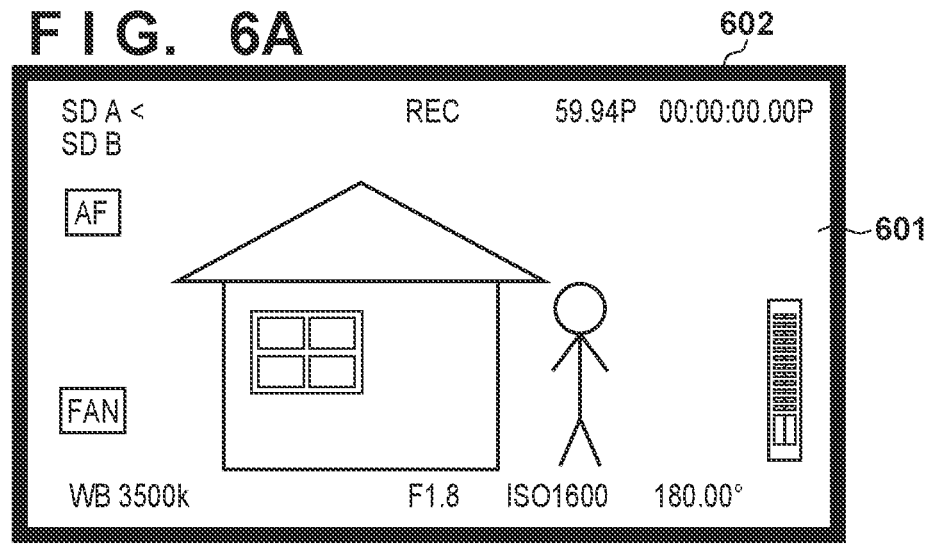
FIGS. 6A to 6C are diagrams illustrating examples of a display screen according to the embodiment.
Figure 6B:
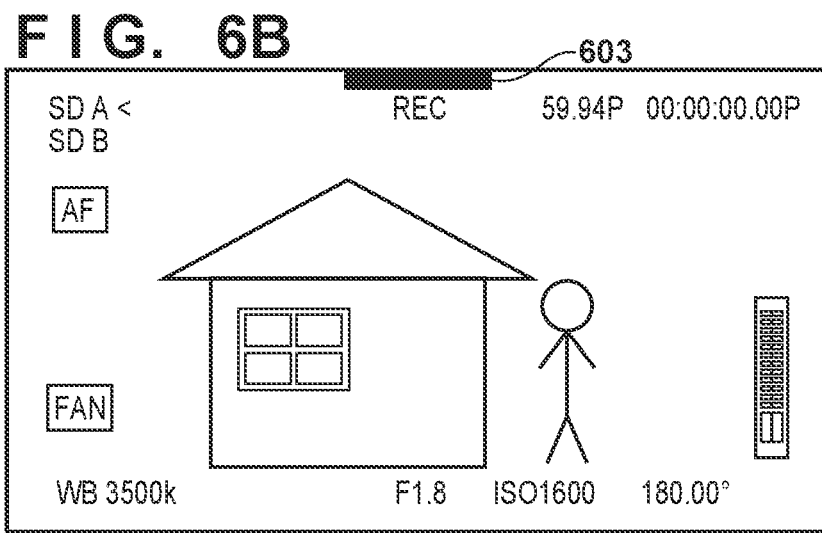
Figure 6C:
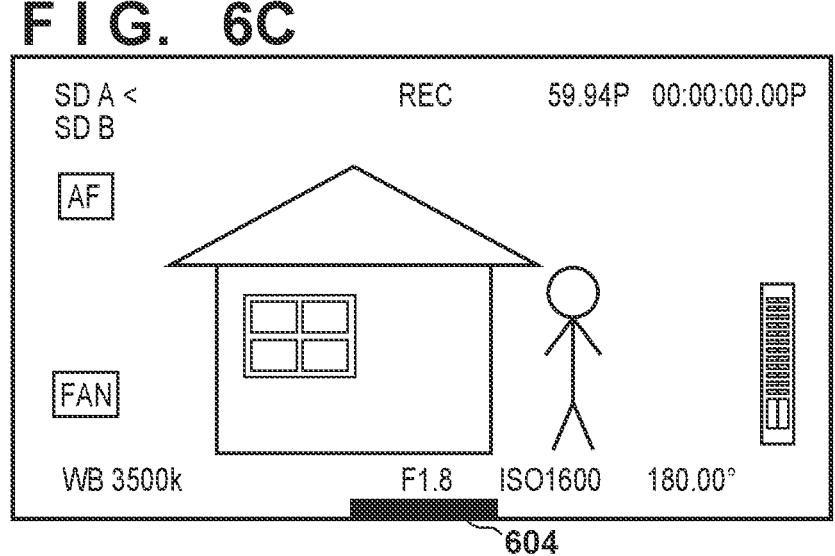

FIGS. 6A to 6C are diagrams illustrating examples of the display formats of the tally display in the normal mode. FIG. 6A is a diagram illustrating an example of a screen displaying a tally display 602 when the frame surrounding the screen is selected as the display format of the tally display. 601 denotes the image. FIG. 6B is a diagram illustrating an example of a screen displaying a tally display 603 when the upper bar is selected. FIG. 6C is a diagram illustrating an example of a screen displaying a tally display 604 when the lower bar is selected.

Note that in the present embodiment, the user can select from tally signal display formats including the frame surrounding the screen, the bar in the upper portion of the screen, and the bar in the lower portion of the screen, but another display format may be used. For example, a bar may be displayed on any one side of the screen such as the left or right side of the screen.

In step S301, when an operation to change the display format of the tally display has been performed, the processing proceeds to step S302. Otherwise, the processing proceeds to step S303.

In step S302, the tally display format is stored by the value set in step S301 being stored in the RAM 111.

In step S303, it is determined whether or not a tally signal is input into the tally signal input unit 107. If a tally signal is input, the processing proceeds to step S304, the setting value for the tally display is set to ON, the setting value is stored in the RAM 111, and the processing ends. In this manner, the CPU 118 displays the normal tally display while the tally signal is being input.

On the other hand, if a tally signal is not input, the processing proceeds to step S305, the setting value for the tally display is set to OFF, the setting value is stored in the RAM 111, and the processing ends.

When the tally display setting processing of step S204 ends, the processing proceeds to step S205, and focus position enhancement display setting processing is executed. Focus position enhancement display is, when the current position of the focus lens included in the lens 101 of the video camera 100 is at or near a pre-registered and predetermined focus position, displaying a focus position guide to notify this.

The focus position enhancement display setting processing executed in step S205 will now be described with reference to the flowchart in FIG. 4.

In step S401, it is determined whether or not there has been a focus position register operation via an operation of the operation unit 106 by the user. When there has been a register operation, the processing proceeds to step S402, the focus position targeted for the register operation in step S401 is stored in the RAM 111, and the processing proceeds to step S403. When there has not been a register operation, the processing proceeds to step S403 as is.

In step S403, a focus position guide is displayed. Here, in the focus position dedicated mode, for example, a display like that in FIG. 5B is displayed, and when in the normal mode, for example, a display like that in FIG. 5A is displayed together with a focus position guide 501 illustrated in FIG. 5B. To display of the focus position guide 501, the focus position registered in step S402 is read out from the RAM 111 and register markers 502 and 503 are rendered at the positions on the focus position guide 501 corresponding to the registered focus positions. Rendered OSD items are output to each output destination via the output I/F 117.

Subsequently, in step S404, the focus position stored in step S402 is read out from the RAM 111, and whether or not the current position of the focus lens included in the lens 101 matches the stored focus position is determined. Here, in a case where the current position is within a predetermined range (for example, a range which is a multiple of the depth of field) from the stored focus position, it is determined that the positions match. If the positions match, the processing proceeds to step S405. If the positions do not match, the processing proceeds to step S406.

In step S405, the setting value for the focus position enhancement display is set to ON, the setting value is stored in the RAM 111, and the processing ends. On the other hand, in step S406, the setting value for the focus position enhancement display is set to OFF, the setting value is stored in the RAM 111, and the processing ends.

Returning to FIG. 2A, when the processing of step S205 ends, in step S206, the setting value for the focus position dedicated mode is read out from the RAM 111, and whether or not a screen is being displayed in the focus position dedicated mode is determined. If the display is in the focus position dedicated mode, the processing proceeds to step S207, and if the display is not in the focus position dedicated mode, the processing proceeds to step S214.

In step S207, the setting value for the focus position enhancement display set in step S405 or step S406 is read out from the RAM 111, and whether or not the setting value is ON is determined. If it is ON, the processing proceeds to step S208. If it is OFF, the processing proceeds to step S209.

In step S208, focus position enhancement display is performed. The focus position enhancement display is rendered as an OSD item by the OSD rendering unit 113, and the rendered OSD item is output to each output destination via the output I/F 117.

FIG. 7 is a diagram illustrating an example of a screen displaying a focus position guide and a focus position enhancement display in the focus position dedicated mode. 701 denotes a slide bar of the focus position guide, 702 and 705 denote register markers corresponding to registered focus positions, 703 denotes the current focus position of the focus lens of the video camera 100, and 704 denotes a focus position enhancement display. Here, a thick frame surrounding the screen is displayed as the focus position enhancement display.

In step S209, the setting value for the tally display set in step S304 or step S305 is read out from the RAM 111, and whether or not the setting value is ON is determined. If it is ON, the processing proceeds to step S210. If it is OFF, the processing returns to step S201.

In step S210, the setting value for the display format of the tally display set in step S302 is read out from the RAM 111, and whether or not the display format is the same as that of the focus position enhancement display is determined. If they are the same, the processing proceeds to step S211. If they are not the same, the processing proceeds to step S212. Note that in the present embodiment, whether or not the display format is the same as that of the focus position enhancement display is determined. However, whether or not the display format of the tally display is a frame surrounding the screen may be determined, or whether or not the focus position enhancement display and the display overlap may be determined.

In step S211, the tally display is displayed in the display format of the upper bar illustrated in FIG. 6B or the lower bar illustrated in FIG. 6C. An upper bar or a lower bar is rendered as an OSD item by the OSD rendering unit 113, and the rendered OSD item is output to each output destination via the output I/F 117. At this time, the upper bar or lower bar to be rendered may be rendered with a thicker line than a normal line, and text indicating the tally display may be rendered at or near the upper bar or the lower bar. In this manner, even when the tally display and the focus position enhancement display are simultaneously displayed, the user can easily recognize the tally display. Note that in the present embodiment, the display format is an upper bar or a lower bar. However, as long as the focus position enhancement display and the display format are not the same and do not overlap, a different display format can be selected as the tally display format.

FIG. 8A is a diagram illustrating an example of a screen when the focus position enhancement display and the tally display are simultaneously displayed in step S211. An upper bar 801 displayed thicker than normal is the tally display. Text 802 indicates that the upper bar 801 is the tally display.

In step S212, the setting value for the display format of the tally display set in step S302 is read out from the RAM 111, and the tally display is displayed in the set display format. The tally display is rendered in the set display format by the OSD rendering unit 113, and the rendered OSD item is output to each output destination via the output I/F 117.

Also, if a screen is not being displayed in the focus position dedicated mode in step S206, in step S214, the determination as in step S207 is performed, and if the focus position enhancement display is ON, the processing proceeds to step S215, and when OFF, the processing proceeds to step S220.

In step S215, the determination as in step S209 is performed, and if the setting value for the tally display is ON, the processing proceeds to step S216, and if it is OFF, the processing proceeds to step S217.

In step S216, the processing as in step S212 is executed. Thereafter, the processing returns to step S201.

In step S217, the determination as in step S210 is performed, and if the same is determined, the processing proceeds to step S218, and if not the same is determined, the processing proceeds to step S219.

In step S218, the focus position enhancement display is displayed in a format that is different from normal. For example, a format that is different from normal includes a display format in which the slide bar of the focus position guide is colored in a single color. By coloring in the slide bar of the focus position guide, the user can more easily realize that the focus position has been brought to the predetermined position. The OSD rendering unit 113 renders the slide bar of the focus position guide colored in a single color and outputs for display the rendered OSD item to each output destination via the output I/F 117.

FIG. 8B is a diagram illustrating an example of a screen displayed in step S218 in a case where the setting value for the tally display in step S215 is OFF. A focus position guide 803 is displayed in an enhancement display state different from the normal format. Note that, as long as the display format is different from the normal format, any display format other then the display format of coloring the focus position guide in a single color may be used.

In step S219, the processing as in step S208 is executed, and the processing returns to step S201. In this case, when the setting value for the tally display is ON, for example, a screen like that illustrated in FIG. 8A is displayed.

In step S220, the determination as in step S209 is performed, and if the setting value for the tally display is ON, the processing proceeds to step S221, and if it is OFF, the processing returns to step S201.

In step S221, the processing as in step S212 is executed, and the processing returns to step S201. In this case, the focus position guide 501 illustrated in FIG. 5B and one of the displays of FIGS. 6A to 6C corresponding to the display format of the tally display set in step S302 are displayed.

As described above, in a case where the focus position dedicated mode is set and the display format of the tally display and the focus position enhancement display are the same, the focus position enhancement display is prioritized, and the tally display is changed to a display format different from that of the focus position enhancement display and displayed. In this manner, the user can distinguish between the focus position enhancement display and the tally display. At this time, by setting the display format of the focus position enhancement display to a frame surrounding the screen, in the focus position dedicated mode, the user can recognize the focus position enhancement display with high association with the mode and not just have their attention on one point.

Also, in the focus position dedicated mode, even when the focus position enhancement display is not displayed, the tally display is displayed in a display format different from that of the focus position enhancement display. In this manner, the user can easily recognize what the display indicates even when only one of the tally display and the focus position enhancement display is displayed.

On the other hand, in a case where the normal mode is set and the display format of the tally display and the focus position enhancement display are the same, the tally display is prioritized, and the focus position enhancement display is displayed in a display format different from normal. In this manner, the user can distinguish between the focus position enhancement display and the tally display. At this time, by setting the display format of the tally display to a frame surrounding the screen, in the normal mode, the user can recognize the tally display with a high importance for comprehending the image capture state and not just have their attention on one point.

Also, in the normal mode, even when the tally display is not displayed, the focus position enhancement display is displayed in a display format different from that of the tally display. In this manner, the user can easily recognize what the display indicates even when only one of the tally display and the focus position enhancement display is displayed.

Note that in step S206 in FIG. 2A, when it is determined that the screen is being displayed in the focus position dedicated mode, the option of the display format that is the same as that of the display format of the focus position enhancement display may be omitted from the options for the display format of the tally display able to be changed to in step S301 performed thereafter. Alternatively, processing may be executed to not allow the user to select the display format of the tally display or to not accept a change in step S302 in a case where the same format as the display format of the focus position enhancement display is selected. In this manner, the user can comprehend that the tally display cannot be displayed in the same display format as the focus position enhancement display on the focus position dedicated screen.

Note that in the embodiment described above, when the display format of the tally display and the display format of the focus position enhancement display are the same display format, one of the display formats is changed. However, no such limitation is intended, and it is sufficient that the display formats are made different. Accordingly, the display format of the tally display and the display format of the focus position enhancement display may both be changed so that they have different display formats.

Also, in the embodiment described above, a display indicating that a tally signal is input and a display indicating that the current position of the focus lens is within a predetermined range from a registered focus position are described, but the present invention is not limited thereto. For example, a display indicating a predetermined specific image capture state in which pixel saturation or black clipping has occurred, a display indicating a predetermined specific focus state in which a specific subject extracted from an image is in focus, or an appropriate combination thereof can be used.

Note that the present invention may be applied to a system constituted of a plurality of devices or may be applied to an apparatus including a solitary device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-122016, filed Jul. 29, 2022 which is hereby incorporated by reference herein in its entirety.

What is claimed is:

1. An image capturing apparatus, comprising one or more processors and/or circuitry which function as:

an obtaining unit that obtains an image captured by an image capturing unit; and a display controlling unit that performs control to display the image on a display unit, wherein the display controlling unit controls, to display a first display item indicating that the image capturing apparatus is selected from among a plurality of image capturing apparatuses including the image capturing apparatus and a second display item indicating a predetermined specific focus state, and in a case where the first display item and the second display item are set to be displayed in a first display format, under a condition in which the first display item and the second display item are displayed simultaneously, to display at least one of the first display item or the second display item in a second display format different from the first display format.

2. The image capturing apparatus according to claim 1, wherein the display format of the first display item can be one selected from a plurality of display formats, and in a case where the display format of the second display item and a selected display format of the first display item are the same, the display controlling unit changes at least one of the display format of the first display item or the display format of the second display item to make the display formats different.

3. The image capturing apparatus according to claim 2, wherein the display format of the second display item is fixed, and in a case where the display format of the second display item and the selected display format of the first display item are the same, the display controlling unit changes the display format of the first display item to make the display formats different.

4. The image capturing apparatus according to claim 1, wherein, in a display mode displaying the second display item, in a case where the first display item is also displayed, the image capturing unit changes the display format of the first display item.

5. The image capturing apparatus according to claim 4, wherein, in a display mode displaying the second display item, in a case where the first display item is also displayed, in the display format of the first display item, text indicating that the image capturing apparatus is selected from among the plurality of image capturing apparatuses is displayed.

6. The image capturing apparatus according to claim 1, wherein the specific focus state is a state in which a focus lens is positioned within a predetermined range of a preset focus position.

7. The image capturing apparatus according to claim 1, wherein the one or more processors and/or circuitry further functions as a receiving unit that receives a tally signal from an external apparatus, wherein the receiving unit is receiving the first display item indicates that the tally signal is being received from an external apparatus.

8. The image capturing apparatus according to claim 1, wherein the display format of the first display item includes a display surrounding a screen and a bar display on one side of the screen.

9. The image capturing apparatus according to claim 8, wherein the display surrounding the screen and the bar display on one side of the screen are displayed along an end portion of the display unit.

10. The image capturing apparatus according to claim 1, wherein a focus position guide indicating a difference between a preset focus lens position and a current focus lens position is further displayed.

11. The image capturing apparatus according to claim 1, wherein the display format of the second display item includes a display surrounding a screen.

12. The image capturing apparatus according to claim 1, further comprising an image capturing unit that performs photoelectric conversion of light incident via an optical system, wherein the display controlling unit performs display control to display an image obtained via photoelectric conversion by the image capturing unit on the display unit.

13. The image capturing apparatus according to claim 1, wherein, in a case where the first display item and the second display item are set to be displayed in the first display format, in a case where the image capturing apparatus is a selected state and a focus state is the specific focus state, the display controlling unit controls to display at least one of the first display item or the second display item is displayed in the second display format.

14. An image capturing method, comprising:

obtaining an image captured by image capturing unit;

controlling to display the image on a display unit;

displaying a first display item indicating that the image capturing apparatus is selected from among a plurality of image capturing apparatuses including the image capturing apparatus and a second display item indicating a predetermined specific focus state; and in a case where the first display item and the second display item are set to be displayed in a first display format, under a condition in which the first display item and the second display item are displayed simultaneously, displaying at least one of the first display item or the second display item in a second display format different from the from the first display format.

15. A non-transitory computer-readable storage medium storing a program for causing a computer to function as the unit of the image capturing apparatus comprising:

an obtaining unit that obtains an image captured by an image capturing unit; and a display controlling unit that performs control to display the image on a display unit, wherein the display controlling unit controls to display a first display item indicating that the image capturing apparatus is selected from among a plurality of image capturing apparatuses including the image capturing apparatus and a second display item indicating a predetermined specific focus state, and in a case where the first display item and the second display item are set to be displayed in a first display format, under a condition in which the first display item and the second display item are displayed simultaneously, to display at least one of the first display item or the second display item in a second display format different from the first display format.

\* \* \* \* \*